Figure 1:
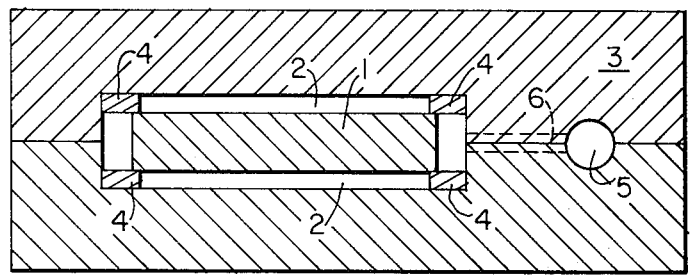

United States Patent [19]

Sanker et al.

[11] 4,043,946
[45] Aug. 23, 1977

[54] PRODUCTION OF SUPPORTED RANEY NICKEL CATALYSTS BY REACTIVE DIFFUSION

[75] Inventors: Philip E. Sanker; Laurance L. Oden, both of Albany; James H. Russell, Corvallis, all of Oreg.

[73] Assignee: The United States of America as represented by the Secretary of the Interior, Washington, D.C.

[21] Appl. No.: 709,990

[22] Filed: July 30, 1976

[51] Int. Cl.$^2$ .................. B01J 21/04; B01J 23/74
[52] U.S. Cl. ................... 252/466 J; 252/462; 252/465; 252/466 B; 252/477 Q
[58] Field of Search ............... 252/466 J, 477 Q, 462, 252/465, 466 B; 427/247, 383 C, 383 D, 431

[56] References Cited

U.S. PATENT DOCUMENTS

| | | | |
|---|---|---|---|
| 2,396,730 | 3/1946 | Whitfield et al. | 427/431 X |
| 3,000,755 | 9/1961 | Hanink et al. | 427/383 D |
| 3,839,011 | 10/1974 | Larson | 252/477 Q |

Primary Examiner—W. J. Shine
Attorney, Agent, or Firm—William S. Brown; Donald A. Gardiner

[57] ABSTRACT

A method for making a supported Raney nickel catalyst by casting molten aluminum heated to about 850° C around a nickel substrate in a mold heated to about 1,050° C, retaining the metals in the mold at 1,050° C for about 30 seconds, allowing the mold to cool to ambient temperature, removing the casting from the mold and activating it by leaching with hot sodium hydroxide.

7 Claims, 2 Drawing Figures

U.S. Patent    Aug. 23, 1977    4,043,946

PRODUCTION OF SUPPORTED RANEY NICKEL CATALYSTS BY REACTIVE DIFFUSION

BACKGROUND OF THE INVENTION

This invention relates to improvements in the method of making a Raney nickel catalyst.

Raney nickel catalysts are well known, hydrogenation catalysts and supported catalysts of this material have been formed by a number of methods. Goldberger, U.S. Pat. No. 3,637,437 discloses flame spraying Raney catalyst material onto a substrate and then leaching the aluminum from the alloy. While the catalytic structures produced by this method are highly active, they are subject to spalling during the activation step, and the process is labor intensive and hence relatively costly. In addition, the mode of application often results in severe distortions of non-rigid substrates due to non-uniform heating.

Another method proposed involves forming a layer of aluminum and nickel and the interdiffusion of these metals to form a catalyst layer at the interface. Nickel can be the substrate, or can be applied as a layer to a substrate by electrodeposition flame spraying, vapor phase deposition, or other suitable means. U.S. Pat. No. 3,846,344 to Larson et al, exemplifies this prior art, and shows interdiffusion of aluminum and nickel at a temperature below the melting point of aluminum.

Under these temperature conditions the alloy $Ni_2Al_3$ is produced as a major product. This is undesirable in that this alloy is not activated during the subsequent leaching operation with aqueous sodium hydroxide solution. The desired phase, $NiAl_3$, which is the precursor to the active catalyst, is formed in a thin layer (about 0.025 mm) between the $Ni_2Al_3$ and the Al. Catalysts prepared by the low temperature interdiffusion process are therefore relatively short lived because of the thin layer of active catalyst produced.

SUMMARY OF THE INVENTION

This invention is directed to the production of the precursor of a Raney nickel catalyst having a relatively thick layer of $NiAl_3$ on $Ni_2Al_3$ intermediate layer, which in turn is on a nickel substrate. The method involves placing a nickel substrate in a mold having a cavity somewhat larger than the substrate, and heating the mold to about 1050° C in a furnace. Molten aluminum at a temperature of about 850° C is poured into the mold cavity, and the temperature of the mold is kept at 1,050° C for 30 seconds. Thereafter the mold is removed from the furnace and allowed to cool to ambient temperature. Subsequently, the casting is removed and activated by treating with a sodium hydroxide solution.

It is an object of the present invention to provide an inexpensive and efficient method to produce a superior supported Raney nickel catalyst.

It is a further object of this invention to produce the precursor for a Raney nickel catalyst by casting molten aluminum around a nickel substrate heated to 1,050° C, maintaining this temperature for about 30 seconds, and cooling the casting to ambient temperature.

Yet another object of the invention is to include minor proportions of alloying elements in the molten aluminum which are soluble therein at the pouring temperature.

A further object of the invention is to alloy the aluminum with palladium, calcium, cerium, copper or magnesium, or mixtures of two or more of these elements.

A further object is to provide a nickel substrate containing a minor alloying element such as for example, molybdenum, cobalt or rhenium.

Yet another object of the invention is to provide a Raney nickel catalyst precursor having a nickel substrate, a $Ni_2Al_3$ intermediate layer and a $NiAl_3$ outmost layer.

Further objects will be apparent from the following specification and claims. THE DRAWING FIG. 1 is a cross-sectional view of the mold showing the sheet of nickel in place in the mold prior to the addition of the molten aluminum.

Figure 2:
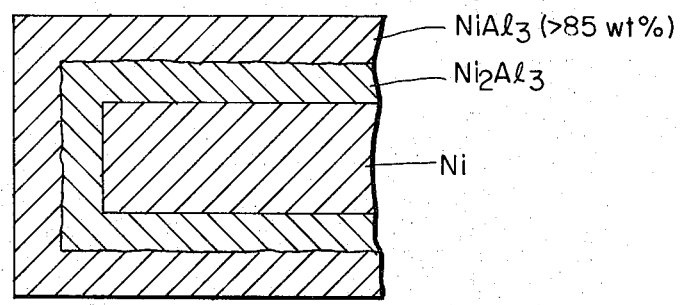

FIG. 2 is a cross-sectional view of the Raney nickel catalyst precursor.

THE INVENTION

As shown in FIG. 1, a sheet of nickel 1 is placed in the cavity 2 of a graphite mold 3. The cavity is larger than the sheet amount such that the edges of the cavity are from about 0.50 to about 1.3 mm distant from the adjacent sides of the sheet.

Sheet 1 is centered within the cavity by small graphite tabs 4. Molten aluminum is poured into the mold via sprue 5, and enters the cavity through gate 6. As will be described more fully below, after the mold is cooled and the cavity removed, the nickel catalyst has the structure shown in FIG. 2.

Within a graphite mold, as shown in FIG. 1, a sheet of nickel is placed in the cavity and spaced from the edges by small graphite tabs. The mold is placed in a suitable furnace and heated to about 950–1050° C. Molten aluminum in the temperature range from about 700° to about 900° C is poured into the mold to completely encase the nickel sheet substrate. After pouring is terminated, the mold is held at the furnace temperature for about a 30 seconds soak time to allow controlled dissolution of the nickel substrate into the molten aluminum. The preferred temperature for the dissolution is 1,050° C, at which the nickel dissolves in the aluminum to the extent of about 42 wt.%, which corresponds to the preferred alloy composition $NiAl_3$. Longer soak periods enhance the formation of $Ni_2Al_3$ at the nickel substrate-alloy boundry, while shorter periods do not allow sufficient dissolution of the nickel. The thickness of the alloy formed is controlled by the initial thickness of the nickel sheet and the inside dimentions of the mold cavity. An alloy thickness of at least 0.5 mm is generally required for methanation reactions.

The mold is removed from the furnace after the 30 seconds soak time and allowed to cool. Intermetallic compound $Ni_2Al_3$ serves to bond the nickel substrate to the $NiAl_3$ Raney nickel catalyst precursor alloy. When cool the casting is removed from the mold, trimmed of risers and is then ready for leaching with alkali metal caustic solution, e.g., sodium hydroxide solution, according to the prior art teachings.

Other elements may be incorporated in the Raney catalyst components to modify catalyst activity or to enhance leachability of the Raney nickel alloy in sodium hydroxide solution. Thus, the addition of calcium to the aluminum improves leachability, and palladium serves as a promotor. The use of various elements in Raney-type catalyst as promotors, is well known and is shown for example in U.S. Pat. Nos. 3,674,710, 3,781,227 and 3,839,011.

Instead of using nickel sheet, the nickel may be deposited on a carrier metal, or even on an inorganic support base, by electrodeposition, flame spraying, vapor phase deposition, or other means known to the art.

The following examples illustrate several embodiments of the invention:

EXAMPLE 1

A sheet of nickel 25.4 mm × 152 mm × 1.27 mm was placed in the center of a graphite mold having an internal cavity 3.55 mm thick. The nickel sheet was centered within the cavity by small graphite tabs. The mold, with the contained nickel sheet, was then heated to 1,050° C in an electric furnace for approximately 10 minutes. Molten aluminum at 850° C was then poured in to fill the mold, and the temperature was maintained at 1,050° C for 30 seconds. The mold was then allowed to cool in air, the mold being coated with aluminum paint to prevent oxidation.

Raney nickel layers 1.27 mm thick on both sides of the nickel substrate were produced. After leaching with sodium hydroxide solution, the sample was tested for methanation activity and found to give 99 percent conversion of 25% CO-75% $H_2$ (60 cm²/min total flow) to methane at 320° C.

EXAMPLE 2

The procedure of Example 1 was repeated with aluminum alloy containing 1.17 wt% palladium. The Raney-type nickel catalyst produced was tested for methanation activity as in Example 1 and was found to result in 97% conversion to methane.

Alloying the aluminum with elements soluble in molten aluminum at the pouring temperature was found to be convenient method to add additional elements to the Raney-type catalyst layer. For example, calcium, cerium, copper and magnesium may be added to the aluminum in an amount of up to 5 wt%.

EXAMPLE 3

The method of Example 1 is repeated with a sheet of nickel prealloyed with a desired additive metal such as for example, molybdenum, cobalt or rhenium in an amount of up to 5 wt% to provide the desired additive in the Raney-type catalyst layer. Any element may be added by prealloying with nickel, provided the binary alloy can be mechanically reduced to sheet form.

What is claimed:

1. A method for producing a Raney nickel catalyst which comprises:
    placing a nickel substrate within a mold cavity in a casting mold, the edge of the cavity being spaced about 0.5 to about 1.3 mm from the nickel substrate surface;
    heating the mold to a temperature of from about 950° C to about 1,050° C in a heating zone;
    pouring into said mold cavity molten aluminum heated to a temperature of about 700° to about 900° C to fill said cavity whereby the molten aluminum contacts the nickel substrate;
    continuing heating said mold in the heating zone for about 30 seconds after the pouring of the aluminum is completed;
    removing the mold from the heating zone;
    allowing the mold to cool to ambient temperature;
    removing from the mold a structure comprising a nickel substrate, a $Ni_2Al_3$ intermediate layer and a $NiAl_3$ face; and leaching said structure with alkali metal caustic solution to form a Raney nickel catalyst.

2. The method of claim 1 wherein the mold is heated to 1,050° C.

3. The method of claim 2 wherein the molten aluminum is at a temperature of about 850° C.

4. The method of claim 3 wherein the edge of the mold cavity is about 1.3 mm from the nickel substrate surface.

5. The method of claim 4 wherein the structure is leached with sodium hydroxide solution to form a Raney nickel catalyst.

6. The method of claim 1 wherein the aluminum has present as a promoting element an element soluble in the molten aluminum selected from the group consisting of palladium, calcium, cerium, copper and magnesium, in an amount up to 5 wt%.

7. The method of claim 1 wherein the nickel substrate contains a promoter element selected from the group consisting of molybdenum, cobalt and rhenium in an amount up to 5 wt%.